United States Patent [19]

Speer et al.

[11] Patent Number: 5,700,554
[45] Date of Patent: *Dec. 23, 1997

[54] PACKAGING ARTICLES SUITABLE FOR SCAVENGING OXYGEN

[75] Inventors: Drew V. Speer; William P. Roberts, both of Columbia; Charles R. Morgan, Brookeville; Cynthia L. Ebner, Mt. Airy, all of Md.

[73] Assignee: W. R. Grace & Co.-Conn., New York, N.Y.

[*] Notice: The term of this patent shall not extend beyond the expiration date of Pat. Nos. 5,350,622 and 5,529,833.

[21] Appl. No.: 568,329

[22] Filed: Dec. 6, 1995

Related U.S. Application Data

[60] Continuation of Ser. No. 268,047, Jun. 28, 1994, abandoned, which is a division of Ser. No. 52,851, Apr. 23, 1993, Pat. No. 5,346,644, which is a continuation-in-part of Ser. No. 679,419, Apr. 2, 1991, abandoned.

[51] Int. Cl.[6] .................. B32B 27/18; B32B 25/00; B29D 22/00; C09K 15/02
[52] U.S. Cl. .................. 428/220; 428/215; 428/219; 428/411.1; 428/492; 428/500; 252/188.28; 526/90; 526/335
[58] Field of Search .................. 252/18.28; 526/90, 526/335; 428/35.2, 35.3, 35.4, 35.5, 35.8, 35.9, 40.2, 40.6, 215, 219, 516, 220, 411.1, 492, 500, 515

[56] References Cited

U.S. PATENT DOCUMENTS

| | | | |
|---|---|---|---|
| 3,935,141 | 1/1976 | Potts et al. | 428/35.2 |
| 4,051,308 | 9/1977 | Halasa | 526/141 |
| 4,665,119 | 5/1987 | Hirata et al. | 524/399 |
| 4,886,618 | 12/1989 | Novak et al. | 252/188.28 |
| 4,908,151 | 3/1990 | Inoue | 252/188.28 |
| 4,983,651 | 1/1991 | Griffin | 524/47 |
| 5,021,515 | 6/1991 | Cochran et al. | 525/371 |
| 5,049,624 | 9/1991 | Adams et al. | 525/371 |
| 5,108,807 | 4/1992 | Tucker | 428/35.2 |
| 5,153,038 | 10/1992 | Koyama et al. | 428/35.8 |
| 5,211,875 | 5/1993 | Speer et al. | 252/188.28 |
| 5,286,407 | 2/1994 | Inoue et al. | 252/188.28 |
| 5,310,497 | 5/1994 | Speer et al. | 252/188.28 |
| 5,349,034 | 9/1994 | Kakugo et al. | 526/143 |
| 5,350,622 | 9/1994 | Speer et al. | 428/215 |
| 5,364,555 | 11/1994 | Zennes et al. | 252/188.28 |
| 5,387,368 | 2/1995 | Nishimura et al. | 252/188.28 |
| 5,529,833 | 6/1996 | Speer et al. | 428/215 |

FOREIGN PATENT DOCUMENTS

| | | |
|---|---|---|
| 0367390 | 5/1988 | European Pat. Off. . |
| 301719 | 1/1989 | European Pat. Off. . |
| 0367835 | 4/1989 | European Pat. Off. . |
| 0370802 | 11/1989 | European Pat. Off. . |
| 366254 | 5/1990 | European Pat. Off. . |
| 367390 | 5/1990 | European Pat. Off. . |
| 367835 | 5/1990 | European Pat. Off. . |
| 370802 | 5/1990 | European Pat. Off. . |
| 380319 | 8/1990 | European Pat. Off. . |
| 0413105 | 2/1991 | Japan . |
| 2247431 | 10/1992 | United Kingdom . |
| 9000504 | 1/1990 | WIPO . |
| 9000578 | 1/1990 | WIPO . |

OTHER PUBLICATIONS

Labuza and Breene, "Application of 'Active Packaging' for Improvement of Shelf Life and Nutritional Quality of Fresh and Extended Shelf–Life Foods", Journal of Food Processing and Preservation, vol. 13, pp. 1–69 (1989).

"Oxygen Scavenging: A Novel Use of Rubber Photo–Oxidation", Michael L. Rooney, *Chemistry & Industry*, Mar. 20, 1982, pp. 197–198.

*Primary Examiner*—Joseph D. Anthony
*Attorney, Agent, or Firm*—Howard J. Troffkin

[57] ABSTRACT

An article useful for packaging oxygen-sensitive products is disclosed. The article is a single or multi-layer article capable of enveloping the oxygen sensitive product. The article has at least one layer which contains a composition composed of an ethylenically unsaturated hydrocarbon polymer and a transition metal salt. The layer is capable of scavenging oxygen at a rate of at least 1 cc oxygen per square meter per day and has a capacity of at least 250 cc oxygen per square meter per mil thickness of the layer.

28 Claims, No Drawings

5,700,554

PACKAGING ARTICLES SUITABLE FOR SCAVENGING OXYGEN

This is a continuation of application Ser. No. 08/268,047, filed Jun. 28, 1994, now abandoned which is a division, of application Ser. No. 052,851, filed Apr. 23, 1993, now U.S. Pat. No. 5,346,644 which is a continuation-in-part of our application U.S. Ser. No. 679,419 filed Apr. 2, 1991 now abandoned for "Compositions, Articles and Methods for Scavenging Oxygen", incorporated herein by reference in its entirety.

FIELD OF THE INVENTION

The invention generally relates to compositions, articles and methods for scavenging oxygen in environments containing oxygen-sensitive products, particularly food and beverage products. As will be evident from the disclosure below, the term "oxygen scavenger" refers to compositions, articles or the like which consume, deplete or reduce the amount of oxygen from a given environment.

BACKGROUND OF THE INVENTION

It is well known that regulating the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is through "active packaging," whereby the package for the food product is modified in some manner to regulate the food product's exposure to oxygen. See Labuza and Breene, "Application of 'Active Packaging' for Improvement of Shelf Life and Nutritional Quality of Fresh and Extended Shelf-Life Foods," *Journal of Food Processing and Preservation*, Vol. 13, pp. 1–69 (1989). The inclusion of oxygen scavengers within the cavity of the package is one form of active packaging. Typically, such oxygen scavengers are in the form of sachets which contain a composition which scavenges the oxygen through oxidation reactions. One sachet contains iron-based compositions which oxidize to their ferric states. Another type of sachet contains unsaturated fatty acid salts on a particulate adsorbent. See U.S. Pat. No. 4,908,151. Yet another sachet contains metal/polyamide complex. See PCT Application 90/00578.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate.

Another means for regulating the exposure to oxygen involves incorporating an oxygen scavenger into the packaging structure itself. Through the incorporation of the scavenging material in the package itself rather than by addition of a separate scavenger structure (e.g., a sachet) to the package, a more uniform scavenging effect throughout the package is achieved. This may be especially important where there is restricted air flow inside the package. In addition, such incorporation can provide a means of intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. See European Applications 367,835; 366,254; 367,390; and 370,802. However, incorporation of these powders and/or salts causes degradation of the wall's transparency and mechanical properties such as tear strength. In addition, these compounds can lead to processing difficulties, especially in the fabrication of thin layers such as thin films. Even further, the scavenging rates for walls containing these compounds appear to be unsuitable for many commercial oxygen-scavenging applications, e.g. such as those in which sachets are employed.

The oxygen scavenging systems disclosed in European Applications 301,719 and 380,319 as well as disclosed in PCT 90/00578 and 90/00504 illustrate another attempt to produce an oxygen-scavenging wall. These patent applications disclose incorporating a metal catalyst-polyamide oxygen scavenging system into the package wall. Through the catalyzed oxidation of the polyamide, the package wall regulates the amount of oxygen which reaches the cavity of the package (active oxygen barrier) and has been reported to have oxygen scavenging rate capabilities up to about 5 cubic centimeters (cc) oxygen per square meter per day at ambient conditions. However, this system does suffer from significant disadvantages.

One particularly limiting disadvantage of the polyamide/catalyst materials is its rate of oxygen scavenging. European Application 301,719 (Example 7) illustrates that adding these materials to a high-barrier package containing air produces a package which is not generally suitable for creating an internal oxygen level of less than 0.1% (starting with air) within a period of four weeks or less at room temperature, as is typically required for headspace oxygen scavenging applications. See Mitsubishi Gas Chemical Company, Inc.'s literature titled "AGELESS®—A New Age in Food Preservation" (date unknown).

Further, in regards to the incorporation of the polyamide/catalyst system into the package wall, polyamides are typically incompatible with the thermoplastic polymers, e.g. ethylene-vinyl acetate copolymers and low density polyethylenes, typically used to make flexible package walls. Even further, when polyamides are used by themselves to make a flexible package wall, they may result in inappropriately stiff structures. Polyamides also incur processing difficulties and higher costs when compared with the costs of thermoplastic polymers typically used to make flexible packaging. Even further, they are sometimes difficult to heat seal. Thus, all of these are factors to consider when selecting materials for packages, especially flexible packages and when selecting systems for reducing oxygen exposure of packaged products.

SUMMARY OF THE INVENTION

It is an object of the invention to obtain a composition which is effective as an oxygen scavenger and is suitable for incorporating into layers used in articles containing oxygen-sensitive products.

It is a further object to obtain an oxygen scavenging composition which is compatible with the materials typically used to prepare such layers.

It is also an object to obtain compositions for scavenging oxygen which can be used in a flexible layer in a multilayer article containing oxygen-sensitive products.

It is a further object of the invention to provide a novel composition suitable for use in packaging of food and beverage products.

It is thus an even further overall object of the invention to overcome the above-mentioned disadvantages of previously used oxygen-scavenging methods.

The above-mentioned objects are obtained from a novel composition comprising:

(a) an ethylenically unsaturated hydrocarbon and (b) a transition metal catalyst.

When the composition is incorporated into a layer such as a film layer, novel articles for packaging oxygen-sensitive products can be prepared therefrom and thus provide a new method for limiting the exposure of such products to oxygen. The articles used in those methods limit the oxygen exposure by acting as an active oxygen barrier and/or acting as means for scavenging oxygen from within the article.

The above-mentioned goals and others will be apparent from the description that follows.

DESCRIPTION OF THE INVENTION

The invention can be used in packaging articles having several forms. Suitable articles include, but are not limited to, rigid containers, flexible bags, or combinations of both. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. In addition the walls of such articles often comprise multiple layers of material. This invention can be used in one, some or all of those layers.

Though it may be preferable from the standpoint of packaging convenience and/or scavenging effectiveness to employ the invention as an integral part of the package wall, the invention can also be used as a non-integral packaging component, e.g. coatings, bottle cap liners, adhesive or non-adhesive sheet inserts, sealants or fibrous mat inserts.

Besides packaging articles for food and beverage, packaging for other oxygen-sensitive products can benefit from the invention. Such products would be pharmaceuticals, oxygen sensitive medical products, corrodible metals or products such as electronic devices, etc.

The ethylenically unsaturated hydrocarbon (a) may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., trans-polyisoprene), polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydro-carbons further include carotenoids such as β-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates.

The composition used may also comprise a mixture of two or more of the substituted or unsubstituted ethylenically unsaturated hydrocarbons described above.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is acceptable.

When making transparent oxygen-scavenging layers according to this invention, 1,2-polybutadiene is especially preferred as component (a). For instance, 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

As indicated above, (b) is a transition metal catalyst. While not being bound by any particular theory, suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, (b) is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

When making layers, such as film layers, from compositions wherein (a) is a polymeric compound such as polybutadiene, polyisoprene or copolymers thereof or polypentenamer, etc., the layer can be prepared directly from (a). On the other hand, (a) and transition metal catalyst (b) may be further combined with one or more polymeric diluents, such as thermoplastic polymers which are typically used to form film layers in plastic packaging articles. Even in the event (a) is a thermoplastic polymer, e.g. polybutadiene, it is sometimes suitable to include one or more additional polymeric diluents. In the manufacture of certain packaging articles well known thermosets can also be used as the polymeric diluent.

Selecting combinations of diluent and (a) depends on the properties desired. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. See European Application 301,719. Blends of different diluents may also be used. However, as indicated above, the selection of the polymeric diluent largely depends on the article to be manufactured and the end use. Such selection factors are well known in the art.

If a diluent polymer-such as a thermoplastic is employed, it should further be selected according to its compatibility with the ethylenically unsaturated hydrocarbon selected for (a). In some instances, the clarity, cleanliness, effectiveness as an oxygen scavenger, barrier properties, mechanical properties and/or texture of the article can be adversely affected by a blend containing a polymer which is incompatible with (a). For instance, it has been found that when (a) is dehydrated castor oil, a less "greasy" film is prepared from a blend with ethylene-acrylic acid copolymer than with ethylene vinyl acetate copolymer.

Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by melt-blending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When making film layers or articles from oxygen-scavenging compositions, (co) extrusion, solvent casting, injection molding, stretch blow molding, orientation, thermoforming, extrusion coating, coating and curing, lamination or combinations thereof would typically follow the blending.

The amounts of (a), (b), optional polymeric diluents and additives, vary depending on the article to be manufactured and its end use. These amounts also depend on the desired oxygen scavenging capacity, the desired oxygen scavenging rate, and the particular materials selected.

For instance, the primary function of (a) is to react irreversibly with oxygen during the scavenging process, and the primary function of (b) is to facilitate this process. Thus, to a large extent, the amount of (a) will affect the oxygen capacity of the composition, i.e., affect the amount of oxygen that the composition can consume, and the amount of (b) will affect the rate at which oxygen is consumed. It also thus follows that the amount of (a) is selected in accordance with the scavenging capacity needed for a particular application, and the amount of (b) is selected in accordance with the scavenging rate needed. Typically, the amount of (a) may range from 1 to 99%, preferably from 10 to 99%, by weight of the composition or layer in which both (a) and (b) are present (herein referred to as the "scavenging component", e.g., in a coextruded film, the scavenging component would comprise the particular layer(s) in which (a) and (b) are present together). Typically, the amount of (b) may range from 0.001 to 1% (10 to 10,000 ppm) of the scavenging component, based on the metal content only (excluding ligands, counterions, etc.). In the event the amount of (b) is about 0.5% or less, it follows that (a) and/or the diluent will comprise substantially all of the composition.

If one or more diluent polymers are used, those polymers may comprise, in total, as much as 99% by weight of the scavenging component.

Any further additives employed would normally not comprise more than 10% of the scavenging component, with preferable amounts being less than 5% by weight of the scavenging component.

As mentioned above, the oxygen scavenging composition may be used in a flexible or rigid single layer or multilayer article. The layers comprising the composition may be in several forms. They may be in the form of stock films, including "oriented" or "heat shrinkable" films, which may ultimately be processed as bags, etc. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

In multilayered articles, the oxygen scavenging layer may be included with layers such as, but not necessarily limited to, "oxygen barriers", i.e. layers of material having an oxygen transmission rate equal to or less than 500 cubic centimeters per square meter ($cc/m^2$) per day per atmosphere at room temperature, i.e. about 25° C. Typical oxygen barriers comprise poly(ethylene vinyl alcohol), polyacrylonitrile, polyvinyl chloride, poly(vinylidene dichloride), polyethylene terephthalate, silica, and polyamides. Copolymers of certain materials described above, and metal foil layers, can also be employed.

The additional layers may also include one or more layers which are permeable to oxygen. In one preferred embodiment, especially for flexible packaging for food, the layers include, in order starting from the outside of the package to the innermost layer of the package, (i) an oxygen barrier layer, (ii) a layer comprising the invention, i.e. the scavenging component as defined earlier, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of (a), (b), other additives, or by-products of scavenging into the package interior. Even further, layer (iii) may also improve the heat-sealability, clarity and/or resistance to blocking of the multilayer film.

The multilayered articles can be prepared using coextrusion, coating and/or lamination. In addition to oxygen barrier and oxygen permeable layers, further layers such as adhesive layers may be adjacent to any of the layers listed above. Compositions suitable for adhesive layers include those well known in the art, such as anhydride functional polyolefins.

To determine the oxygen scavenging capabilities of the invention, the rate of oxygen scavenging can be calculated by measuring the time elapsed before the article depletes a certain amount of oxygen from a sealed container. For instance, a film comprising the scavenging component can be placed in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining.

When an active oxygen barrier is required, a useful scavenging rate can be as low as 0.05 cc oxygen ($O_2$) per gram of (a) in the scavenging component per day in air at 25° C. and at 1 atmosphere pressure. However, the composition of this invention has the capability of rates equal to or greater than 0.5 cc oxygen per gram of (a) per day, thus making it suitable for scavenging oxygen from within a package, as well as suitable for active oxygen barrier applications. The composition is even capable of more preferable rates equal to or greater than 5.0 cc $O_2$ per gram of (a) per day.

Generally, film layers suitable for use as an active oxygen barrier can have a scavenging rate as low as 1 cc oxygen per square meter per day when measured in air at 25° C. and 1 atmosphere pressure. However, a layer of this invention is capable of a scavenging rate greater than 10 cc oxygen per square meter per day, and preferably has an oxygen scavenging rate equal to or greater than about 25 cc oxygen per square meter per day under the same conditions, thus making it suitable for scavenging oxygen from within a package, as well as suitable for active oxygen barrier applications. Under different temperature and atmospheric conditions, the scavenging rates of the composition and layers of the invention will be different. The rates at room temperature and one atmosphere were measured because they best represent the conditions under which the invention will be exposed in many instances.

In an active oxygen barrier application, it is preferable that the combination of oxygen barriers and any oxygen scavenging activity create an overall oxygen transmission rate of less than about 1.0 cubic centimeters per square meter per day per atmosphere at 25° C. It is also preferable that the oxygen scavenging capacity is such that this transmission rate is not exceeded for at least two days. See European Application 301,719. Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to establish an internal oxygen level of less than 0.1% in less than about four weeks. See Mitsubishi literature supra.

In a packaging article according to this invention, the scavenging rate capability will depend primarily on the amount and nature of (a) and (b), and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of (a) present in the scavenging component.

In actual use, the oxygen scavenging capacity requirement of the article will largely depend on three parameters of each application:

(1) the quantity of oxygen initially present in the package, (2) the rate of oxygen entry into the package in the absence of the scavenging property, and (3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 1200 cc oxygen per square meter per mil thickness.

Other factors may also affect oxygen scavenging and should be considered when selecting compositions for the scavenging. These factors include but are not limited to temperature, relative humidity, and the atmospheric environment in the package. See Examples 9–18.

As illustrated in the Examples, some embodiments of the invention go through an "induction period" before they exhibit oxygen scavenging. It is believed that antioxidants present in commercially available materials used to make the invention increases the induction period. For instance, comparison of Examples 25 and 26; 20 and 28; 21 and 27; and 29 and 30 illustrates increased induction periods. To counter the antioxidant and thus decrease its effect, peroxides can be added. Other methods of countering the antioxidant would include extracting it prior to fabrication. See Example 25. Even further, materials absent antioxidants could be selected to make the invention.

In order to further illustrate the practice of the present invention and the advantages thereof, the following examples are provided. However, these examples are in no way meant to be limitive, but merely illustrative.

COMPARISON EXAMPLE

A film of poly(ethylene-vinyl acetate) was prepared and tested as follows. A solution of 2.0 g ELVAX® poly (ethylene-vinyl acetate) having 28% by weight vinyl acetate (EVA-28) from Du Pont was prepared in 20 milliliters (mL) tetrahydrofuran (THF) and 5 mL toluene with warming. Sufficient NOURY-DRY® cobalt solution from Akzo Chemicals was added to give a loading of 470 ppm. The resulting formulation was solvent cast under nitrogen onto a surface coated with TEFLON® non-stick coating. Afterwards, the dried film was removed and placed in a 125 mL flask which was stoppered with a rubber septum. Oxygen content in the flask was then monitored by removing 4 cc samples with a gastight syringe at various time intervals and analyzing the samples using a MOCON® model LC 700F oxygen analyzer. The gas samples removed were replaced with nitrogen to maintain atmospheric pressure within the flask. The results are summarized below:

| Day | % Oxygen |
|---|---|
| 0 | 20.6 |
| 3 | 20.3 |
| 4 | 20.1 |
| 6 | 19.7 |
| 10 | 19.7 |
| 13 | 19.3 |

These results illustrate that no detectable scavenging occurred under the test method employed. It is believed that the observed slight decrease in oxygen level is fully attributable to the sampling procedure, which involves replacement of the sampled air in the flask with pure nitrogen.

EXAMPLE 1

A solution of 2.16 g of trans-poly(isoprene) from Aldrich was prepared in 65 mL of tetrahydrofuran, THF, with warming. The THF used contained between 1000–2000 ppm of peroxides, as measured with EM QUANT® peroxide test strips from EM Science, Inc. Sufficient NOURY-DRY® cobalt solution from Akzo Chemicals was added to achieve a loading of 4,400 ppm of cobalt based on the pure metal. A 3.0 mm thick wet film was then cast from the resulting solution in a nitrogen atmosphere. The cured film was placed in a 125 mL Erlenmeyer flask containing air and was stoppered with a rubber septum. Oxygen levels of the atmosphere in the flask were measured according to the method described in the Comparison Example.

| Time (Days) | % Oxygen |
|---|---|
| 0 | 20.6 |
| 1 | 20.3 |
| 4 | 19.8 |
| 7 | 19.1 |
| 11 | 0.60 |
| 13 | 0.25 |
| 15 | 0.15 |
| 19 | 0.08 |

EXAMPLE 2

A solution of 2.0 g of poly(ethylene-vinyl acetate) (28% vinyl acetate), EVA-28, was prepared with warming in 20 mL of THF containing peroxides as described in Example 1 and 5 mL of toluene. Squalene from Aldrich was added to give 15% by weight (total), and sufficient NOURY-DRY® cobalt solution was added to give 500 ppm cobalt (as metal). A 1.6 mm thick wet film was cast, cured and tested as in Example 1.

| Time (Days) | % Oxygen |
|---|---|
| 0 | 20.6 |
| 1 | 20.3 |
| 2 | 19.0 |
| 5 | 0.32 |
| 6 | 0.01 |

EXAMPLE 3

A film was prepared and tested as in Example 2, except CASTUNG® 103 GH dehydrated castor oil from Caschem was used in place of squalene. The castor oil was loaded at 15% by weight and the cobalt catalyst at 500 ppm.

| Time (Days) | % Oxygen |
|---|---|
| 0 | 20.5 |
| 1 | 0.02 |
| 4 | 0.03 |
| 5 | 0.02 |

EXAMPLE 4

The same materials and methods described in Example 3 were used and repeated except that a catalyst loading of 400 ppm and a dehydrated castor oil loading of 25% by weight were used.

| Time (Days) | % Oxygen |
|---|---|
| 0 | 20.6 |
| 1 | 0.04 |
| 2 | 0.01 |
| 3 | 0.00 |

EXAMPLES 5–8

For these examples, the following formulations were prepared in a BRABENDER® mixing chamber. Films were prepared by pressing in a CARVER® heated lab press. The films tested were in the range of 2–4 g and were 8–15 mils thick. The films were sealed in barrier bags, which were inflated with 130 cc of air. The bags were inflated by means of a needle through an adhesive rubber strip, which also allowed the removal of 4 cc gas samples. No allowance was made for the decrease in volume.

The polymers tested were LOTRYL® 3600 ethylene-butyl acrylate having 30% by weight butyl acrylate and 3610 ethylene-methyl acrylate having 29% methyl acrylate from Sartomer-Atochem Co.; PRIMACOR® 5980 ethylene-acrylic acid having 20% acrylic acid from Dow Chemical; and 1,2-polybutadiene from Scientific Polymers Products, Inc.. All of the samples tested contained 15% by weight CASTUNG® 103 GH dehydrated castor oil from Caschem Co. and a cobalt (NOURY-DRY® solution) loading of 500 ppm. In the following table, the induction period is the time elapsed in days before the film exhibited oxygen scavenging properties. The time (days) it took for all of the oxygen to be consumed (0.000) and the length of time (days) over which the film was tested are also recorded below.

| Example | Polymer | Castor Oil(a) | Co(II)(b) | Induction (days) | Days to 0.000 | Days Running |
|---|---|---|---|---|---|---|
| 5 | Lotryl 3600 | 15% | 500 | 1 | 4 | 63 |
| 6 | Lotryl 3610 | 15% | 500 | 1 | 8 | 64 |
| 7 | Primacor 5980 | 15% | 500 | 1 | c | 28 |

| Example | Polymer | Castor Oil(a) | Co(II)(b) | Induction (days) | Days to 0.000 | Days Running |
|---|---|---|---|---|---|---|
| 8 | 1,2-Poly-butadiene | 15% | 500 | 3 | d | 33 |

(a) percentage by total weight
(b) in ppm
c oxygen level at 0.43%
d oxygen level at 2.38%

EXAMPLES 9–18

Conditions Affecting Oxygen Scavenging

The atmospheric conditions under which the oxygen scavengers were tested were varied to simulate the packaging of moist and dry products as well as some modified atmosphere packaging (MAP) conditions. See footnotes b and c of the following table. Temperature was varied as well. These tests were conducted with 130 cc of the atmospheres specified in the table below. The examples were prepared according to the method described for Examples 5–8. The compositions all contained 500 ppm cobalt from NOURY-DRY® solution, and as indicated below, all samples except those in Examples 17–18, contained ethylene-vinyl acetate, i.e. EVA-9 and EVA-28. Examples 17–18 illustrate films containing LOTRYL® 3610 ethylene-methyl acrylate and 3600 ethylene-butyl acrylate. All samples contained either 15% or 25% by weight CASTUNG® 103 GH dehydrated castor oil. The induction period, the time elapsed before all of the oxygen was consumed, and the length of time over which the film was tested were also recorded.

| Example | Polymer | Castor Oil | Variations | Gas | Induction (Days) | Days to 0.000 | Days Running |
|---|---|---|---|---|---|---|---|
| 9 | EVA-9 | 25% | 1 mL H$_2$O | a | 1 | 17 | 30 |
| 10 | EVA-28 | 15% | 1 mL H$_2$O | a | 5 | 25 | 27 |
| 11 | EVA-9 | 25% | 10 gm Dessicant | a | 1 | 6 | 28 |
| 12 | EVA-28 | 15% | 10 gm Dessicant | a | 1 | 11 | 27 |
| 13 | EVA-9 | 15% | 40% RH | b | 1 | 4 | 31 |
| 14 | EVA-28 | 25% | 42% RH | b | 1 | 8 | 32 |
| 15 | EVA-9 | 15% | 40% RH | c | 1 | 4 | 30 |
| 16 | EVA-28 | 25% | 42% RH | c | 3 | 8 | 32 |
| 17 | Lotryl 3610 | 15% | Room Temp. | a | <1 | 8 | 65 |
| 18 | Lotryl 3600$^d$ | 15% | −5° C. | a | <1 | 13 | 65 | a Air, i.e. 20.6% O$_2$
b 3.1% O$_2$, Balance N$_2$
c 0.93% O$_2$, 30.3% CO$_2$, Balance N$_2$
$^d$Compare with Example 5 which illustrates scavenging by 3600 at room temperature.

From the above results, it does not appear that varied humidity levels significantly affect scavenging performance. See Examples 9–12. Further, low oxygen content does not significantly affect scavenging performance. See Examples 13–16. In addition, the presence of carbon dioxide does not affect that performance. See Examples 15 and 16. Comparison of Examples 17 and 18, and Example 5 from the previous table illustrates that scavenging performance is not significantly affected by lower temperatures.

EXAMPLES 19–26

Except for Example 26, films illustrated in these Examples were prepared by solvent casting methods described in Examples 1–4 and tested as illustrated in Examples 5–8. Example 19 illustrates that casting a film using a solvent such as methylene chloride will produce essentially the same results seen in melt blended films. Compare with Examples 9–12.

These Examples also provide support for the belief that antioxidants have an effect on the induction period and that the addition of peroxides can be used to reduce that effect. Example 24 illustrates the effect which 2,6-di-t-butyl-4-methylphenol (BHT) has on the induction period. Compare with Example 23. It is believed that Examples 20–22 illustrate how peroxides reduce the effect of antioxidants because it is believed that the polymers employed in Examples 20–22 contain antioxidants typically used with those polymers. Example 25 illustrates the effect of antioxidant by measuring the induction period of a composition which has had antioxidant extracted. Compare with Example 26.

In Example 21, "c/t" refers to cis/trans.

| Example | Polymer | Castor Oil | Co(II) | Solvent | Induction (Days) | Days to 0.000 | Days Running |
|---|---|---|---|---|---|---|---|
| 19 | EVA-4U | 25% | 500 | CH$_2$Cl$_2$ | 2 | 8 | 56 |
| 20 | trans-Poly-isoprene$^a$ | 15%$^b$ | 1000 | THF$^c$ | 14 | 17 | 58 |
| 21 | c/t-1,4-Poly-butadiene | 0% | 1000 | THF$^c$ | 2 | 5 | 32 |
| 22 | 1,2-Poly-butadiene | 0% | 1000 | THF$^c$ | 1 | 2 | 35 |
| 23 | EVA-28 | 20% | 500 | THF$^c$ | 1 | 4 | 73 |
| 24 | EVA-40 | 25% | 500 | THF$^d$ | d | d | 90 |
| 25 | 1,2-Poly-butadiene$^e$ | 0% | 500 | f | <1 | 10 | 16 |
| 26 | 1,2-Poly-butadiene$^g$ | 0% | 500 | h | 28 | 39 | 46 |

$^a$scavenging was not noticed when cis-polyisoprene was used; the film resulting from trans-polyisoprene was somewhat brittle and opaque.
$^b$squalene was used in place of castor oil.
$^c$with peroxides (1000–2000 ppm).
d with 0.15% BHT antioxidant; has not scavenged.
$^e$RB830 1,2-polybutadiene from Japan Synthetic Rubber which had antioxidant extracted by soxhlet extraction with acetone for 48 hours; this polymer was tested in 390 cc air.
f 25 mL methylene chloride and 10 mL toluene.
$^g$1,2-polybutadiene from Scientific Polymer Products, Inc.; believed to contain antioxidants typically added to such polymers.
h Example 26 was melt blended and pressed.

EXAMPLE 27

The following formulation was prepared in a BRABENDER® mixing chamber: 30 g of low density polyethylene from Union Carbide, 10 g of cis-/trans-1,4-polybutadiene from Scientific Polymer Products, Inc. and sufficient NOURY-DRY® solution to make 500 ppm. The formulation was mixed for 15 minutes at 130° C. A film weighing 2-4 g was pressed and tested as in Examples 5–8.

| Time (Days) | Percent Oxygen |
|---|---|
| 0 | 20.6 |
| 3 | 20.6 |
| 7 | 20.6 |
| 10 | 20.0 |
| 11 | 17.5 |
| 12 | 12.7 |
| 17 | 0.000 |
| 21 | 0.000 |

-continued

| Time (Days) | Percent Oxygen |
| --- | --- |
| 48 | 0.000 |
| 70 | 0.000 |

EXAMPLE 28

A film weighing 2–4 g and having the following formulation was prepared and tested as described in Example 27: 35.9 g low density polyethylene, 8.9 g trans-polyisoprene, and sufficient NOURY-DRY® solution to have 500 ppm cobalt.

| Time (Days) | Percent Oxygen |
| --- | --- |
| 0 | 20.6 |
| 4 | 20.6 |
| 14 | 20.4 |
| 21 | 20.4 |
| 28 | 18.5 |
| 35 | 1.66 |
| 39 | 0.000 |
| 59 | 0.000 |

EXAMPLE 29

To a 50 mL beaker was added 2.06 g of ethylene-vinyl acetate EVA-28 (28% vinyl acetate) and 20 mL of THF containing peroxides. With warming, a homogeneous solution was obtained. To the solution was added 0.517 of CASTUNG® 103 GH dehydrated castor oil from Caschem, and a sufficient amount of manganese carboxylate solution from Mooney Chemical to make 500 ppm manganese relative to the total weight of the combined solids. A film having a 1.6 mm wet thickness was then cast under a nitrogen atmosphere. The cured film was sealed in a barrier bag containing 130 cc of air and the oxygen content thereof was monitored periodically as described in the Examples above.

| Day | % Oxygen |
| --- | --- |
| 0 | 20.6 |
| 1 | 4.9 |
| 2 | 0.58 |
| 3 | 0.000 |
| 35 | 0.000 |

EXAMPLE 30

To a 50 mL beaker was added 2.08 g of EVA-40 ethylene-vinyl acetate from Polysciences Inc. and 25 mL of methylene chloride. With warming a homogeneous solution was obtained. To the solution was also added 0.096 g of CASTUNG® 103 GH castor oil and a sufficient manganese carboxylate solution from Mooney Chemical to make 500 ppm manganese relative to the total weight. A film having a wet thickness of 1.6 mm was then cast as described in Example 29. The cured film was sealed in a barrier bag with 130 cc of air, with the oxygen content thereof measured as described in the above Examples.

| Day | % Oxygen |
| --- | --- |
| 0 | 20.6 |
| 1 | 20.5 |
| 7 | 20.0 |
| 13 | 19.5 |
| 15 | 7.0 |
| 18 | 0.000 |
| 31 | 0.000 |

EXAMPLE 31

To a 50 mL beaker was added 2.07 g of 1,2-polybutadiene, which had been soxhlet extracted as in Example 25, along with 20 mL of methylene chloride and 13 mL of toluene. The mixture was warmed until a homogeneous solution was obtained. Sufficient manganese carboxylate from Mooney Chemical was added to give 500 ppm Mn (as metal). A 1.6 mm thick (wet) film was then cast under a nitrogen atmosphere. The cured film was placed in a barrier bag inflated with 390 cc of air. Headspace oxygen level was monitored as described above.

| Time (Days) | % Oxygen |
| --- | --- |
| 0 | 20.6 |
| 1 | 20.6 |
| 8 | 20.6 |
| 12 | 4.8 |
| 13 | 2.8 |
| 14 | 1.12 |
| 16 | 0.013 |
| 20 | 0.000 |
| 26 | 0.000 |

EXAMPLE 32

A masterbatch containing cobalt was prepared by a continuous compounding and a pelletizing operation. Thus, a dry blend of poly(ethylene vinylacetate), vinylacetate 9% (EVA-9), containing 2.3% by weight pellets of TEN-CEM® cobalt (22.5% cobalt by weight) catalyst from Mooney Chemicals was placed in the hopper of a BRABENDER® counter-rotating, intermeshing, twin screw extruder, equipped with a strand die. The extruder was maintained at 120° C., with the die at 110° C. The resulting strand was fed through a water bath to cool and was dried with an air knife. The strand was then fed into a pelletizer.

EXAMPLE 33

A 2–4 g pressed film of the following formulation was prepared as described in Example 27: 26.0 g low density polyethylene, 10.0 g of poly(styrene-butadiene) (23% styrene) from Scientific Polymer Products, and 4 g of the masterbatch prepared according to Example 32. The film was tested as described in Examples 5–8, except that 390 cc of air was used.

| Time (Days) | % Oxygen |
| --- | --- |
| 0 | 20.6 |
| 3 | 19.7 |
| 4 | 18.7 |
| 5 | 16.8 |
| 7 | 12.3 |

-continued

| Time (Days) | % Oxygen |
|---|---|
| 11 | 5.9 |
| 14 | 3.3 |
| 17 | 2.11 |
| 19 | 1.89 |
| 21 | 1.11 |
| 24 | 0.79 |
| 27 | 0.53 |
| 31 | 0.38 |

While the invention has been described with preferred embodiments, it is to be understood that variations and modifications may be resorted to as will be apparent to those skilled in the art. Such variations and modification are to be considered within the purview and the scope of the claims appended hereto.

What is claimed:

1. An article for packaging an oxygen-sensitive product, which article in use envelops the product and comprises a layer suitable for scavenging oxygen comprising an oxygen scavenging component consisting essentially of
   (a) an ethylenically unsaturated hydrocarbon polymer having a molecular weight of at least 1,000 and
   (b) 10–10,000 parts per million based on component (a) of transition metal atom of a transition metal salt; wherein the rate of oxygen scavenging of the layer at 25° C. and one atmosphere of air is at least 1 cc oxygen per square meter per day and the scavenging capacity is at least 250 cc oxygen per square meter per mil thickness of the layer, and wherein scavenging occurs during the storage of the product in the package.

2. An article according to claim 1 wherein the layer comprises a mixture of ethylenically unsaturated hydrocarbons (a).

3. An article according to claim 1 wherein (a) is derived from squalene.

4. An article according to claim 1 wherein (a) is derived from dehydrated castor oil.

5. An article according to claim 1, wherein said layer is flexible.

6. An article according to claim 1 wherein said layer is transparent.

7. An article according to claim 1 wherein (a) is a substituted ethylenically unsaturated hydrocarbon.

8. An article according to claim 7 wherein the substituted ethylenically unsaturated hydrocarbon comprises an oxygen-containing moiety.

9. An article according to claim 8 wherein the oxygen-containing moiety is selected from the group consisting of esters, carboxylic acids, aldehydes, ethers, ketones, alcohols, peroxides and hydroperoxides.

10. An article according to claim 1 wherein (a) is an unsubstituted ethylenically unsaturated hydrocarbon.

11. An article according to claim 10 wherein (a) is selected from the group consisting of polybutadiene, polyisoprene, an isoprene copolymer and butadiene copolymers.

12. An article according to claim 10 wherein (a) is 1,2-polybutadiene.

13. An article according to claim 1 wherein said metal is cobalt.

14. An article according to claim 13 wherein (b) is selected from the group consisting of cobalt neodecanoate and cobalt 2-ethylhexanoate.

15. An article according to claim 1 wherein said metal is manganese.

16. An article according to claim 15 wherein (b) is a manganese carboxylate.

17. An article according to claim 1 wherein said layer in addition comprises polymeric diluent.

18. An article according to claim 17 wherein said diluent is a thermoplastic polymer.

19. An article according to claim 18 wherein said thermoplastic polymer is selected from the group consisting of polyethylene and ethylene copolymers; polypropylene and propylene copolymers; polystyrene and styrene copolymers; and a blend of any of the above.

20. An article according to claim 18 wherein said diluent comprises 1% to 99% by weight of the layer.

21. An article according to claim 11 wherein said layer is adjacent to one or more additional layers.

22. An article according to claim 21 wherein at least one additional layer is an oxygen barrier.

23. An article according to claim 22 wherein said oxygen barrier comprises a material selected from the group consisting of poly(ethylene-vinyl alcohol), polyacrylonitrile, poly (vinyl chloride), polyamides, poly (vinylidene dichloride), poly (ethylene terephthalate), silica and metal foil.

24. An article according to claim 21 wherein one or more of said additional layer or layers is coextruded with said layer.

25. An article according to claim 20 wherein one or more of said additional layer or layers is laminated onto said layer.

26. An article according to claim 21 wherein one or more of said additional layer or layers is coated onto said layer.

27. An article as in any of the proceeding claims wherein the article exhibits a transmission rate equal to or less than 1.0 cc oxygen per square meter of article surface per day per atmosphere at 25° C.

28. An article as in any of the proceeding claims wherein said layer scavanges oxygen at a rate sufficient to reduce the amount of oxygen in an atmosphere within the article to less than 0.1% by volume in less than four weeks.

* * * * *